(12) United States Patent
Beetz

(10) Patent No.: US 12,332,118 B2
(45) Date of Patent: Jun. 17, 2025

(54) SYSTEM AND METHOD FOR DETERMINING A COLOR MIX ON A THREE COLOR DISPLAY DEVICE WITH LOW LUMINANCE OR ILLUMINANCE

(71) Applicant: The Boeing Company, Chicago, IL (US)

(72) Inventor: Steven T. Beetz, St. Louis, MO (US)

(73) Assignee: THE BOEING COMPANY, Arlington, VA (US)

( * ) Notice: Subject to any disclaimer, the term of this patent is extended or adjusted under 35 U.S.C. 154(b) by 741 days.

(21) Appl. No.: 17/657,956

(22) Filed: Apr. 5, 2022

(65) Prior Publication Data

US 2023/0314222 A1    Oct. 5, 2023

(51) Int. Cl.
  *G01J 3/50* (2006.01)
  *G01J 3/46* (2006.01)
  *G09G 3/00* (2006.01)

(52) U.S. Cl.
  CPC .............. *G01J 3/506* (2013.01); *G01J 3/462* (2013.01); *G09G 3/006* (2013.01); *G09G 2340/06* (2013.01)

(58) Field of Classification Search
  CPC .......... G01J 3/506; G01J 3/462; G09G 3/006; G09G 2340/06
  See application file for complete search history.

(56) References Cited

U.S. PATENT DOCUMENTS

| | | | |
|---|---|---|---|
| 2005/0068464 A1* | 3/2005 | Pettitt | G09G 3/2022 348/E5.142 |
| 2016/0261860 A1* | 9/2016 | Gu | G09G 3/006 |
| 2017/0140556 A1* | 5/2017 | Safaee-Rad | H04N 1/60 |
| 2018/0041664 A1* | 2/2018 | Konishi | B41J 2/2146 |
| 2019/0139268 A1* | 5/2019 | Pennig | G06T 7/90 |
| 2020/0380907 A1* | 12/2020 | Marcu | G09G 3/2003 |

OTHER PUBLICATIONS

Extended European Search Report issued Dec. 12, 2023 in corresponding EP Application No. 23164261.2, 18 pages.

\* cited by examiner

*Primary Examiner* — Pinalben Patel
(74) *Attorney, Agent, or Firm* — MH2 Technology Law Group LLP

(57) ABSTRACT

A method for achieving a target white chromaticity value and a target white light output value on a display device includes measuring a chromaticity value of a first primary color, a chromaticity value of a first secondary color, and a chromaticity value of a second secondary color on the display device using a photometer. The method also includes measuring a current white chromaticity value and a current white light output value on the display device using the photometer. The method also includes generating a plot of a color gamut triangle based at least partially upon the measured chromaticity value of the first primary color, the measured chromaticity value of the first secondary color, the measured chromaticity value of the second secondary color, and the measured current white chromaticity value.

18 Claims, 9 Drawing Sheets

SYSTEM AND METHOD FOR DETERMINING A COLOR MIX ON A THREE COLOR DISPLAY DEVICE WITH LOW LUMINANCE OR ILLUMINANCE

FIELD

The subject matter described herein generally relates to addressing color issues on a display device (e.g., a television, computer monitor, smart phone screen, tablet screen, etc.). More particularly, the subject matter disclosed herein relates to determining a precise color mix to achieve a target white chromaticity value and/or a target white light output value (also referred to as luminance and/or illuminance; or luminance/illuminance) on a three color display device with low luminance or illuminance.

BACKGROUND

There are many conventional color science techniques available to address display color issues. A first conventional method for measuring primary colors on a low light output value display can be done by accepting that the instrumentation will be inaccurate at these levels, but will be in the right ballpark. A second conventional method can be done by temporarily boosting display light output value(s) to directly measure how the primary color alters the display characteristics and may cause the values to be different than at their real operating levels. A third conventional method can be done by measuring the primary color with a different piece of instrumentation than the rest of the process. This uses a computation system to handle multiple pieces of instrumentation, and the operator may need to use at least two pieces of equipment. A fourth conventional method can be done by measuring the primary colors from a different location (e.g., closer to the display), which is different from the location of the user. As a result, this can cause erroneous results over the proper perspective. A fifth conventional method can be done by measuring different properties of light to determine an approximate primary color (e.g., measuring the illuminance of a projector when luminance provided by the illuminated screen surface is being sought instead). These may introduce inaccuracies, as portions of the system may impact the transfer function between illuminance and luminance.

For calculating deterministic color gains for a specific chromaticity and light output value, many conventional systems employ a goal-seek method. The system tries making an adjustment with some level of intelligence as to the direction the color needs to move in CIE 1931 color space. The system then continually iterates trying different values until it overshoots, and then the value is decreased to adjust. The system may do this until it homes in on the appropriate control values. This can be time consuming even with automation, as it may involve many iterations as well as waiting for instrumentation to detect the changes which involves an integration delay. It is not uncommon for these types of solvers to take several minutes per location being adjusted.

SUMMARY

A method for achieving a target white chromaticity value and a target white light output value on a display device is described herein. The method includes measuring a chromaticity value of a first primary color, a chromaticity value of a first secondary color, and a chromaticity value of a second secondary color on the display device using a photometer. The method also includes measuring a current white chromaticity value and a current white light output value on the display device using the photometer. The method also includes generating a plot of a color gamut triangle based at least partially upon the measured chromaticity value of the first primary color, the measured chromaticity value of the first secondary color, the measured chromaticity value of the second secondary color, and the measured current white chromaticity value. The method also includes determining a chromaticity value of a second primary color on the color gamut triangle based at least partially upon the measured chromaticity value of the first primary color, the measured chromaticity value of the first secondary color, the measured chromaticity value of the second secondary color, and the measured current white chromaticity value. The method also includes determining a chromaticity value of a third primary color on the color gamut triangle based at least partially upon the measured chromaticity value of the first primary color, the measured chromaticity value of the first secondary color, the measured chromaticity value of the second secondary color, and the measured current white chromaticity value. The method also includes modifying the light output value of the primary colors based at least partially upon the chromaticity value of the second primary color and the chromaticity value of the third primary color to produce a modified white chromaticity value and a modified white light output value on the display device.

In another implementation, the method includes measuring cyan, yellow, and green chromaticity values on the display device using a photometer. The method also includes measuring a current white chromaticity value and a current white light output value on the display device using the photometer. The method also includes generating a plot of a color gamut triangle based at least partially upon the measured cyan, yellow, green, and current white chromaticity values. The method also includes determining a blue chromaticity value on the color gamut triangle based at least partially upon the measured cyan, yellow, green, and current white chromaticity values. The method also includes determining a red chromaticity value on the color gamut triangle based at least partially upon the measured cyan, yellow, green, and current white chromaticity values. The method also includes selecting the target white chromaticity value and a target white light output value for the display device. The method also includes determining a target yellow chromaticity value based at least partially upon the blue chromaticity value and the target white chromaticity value. The method also includes determining a target cyan chromaticity value based at least partially upon the red chromaticity value and the target white chromaticity value. The method also includes determining a target weighted light output value of one or more primary colors based at least partially upon the red chromaticity value, the green chromaticity value, the blue chromaticity value, the target yellow chromaticity value and the target cyan chromaticity value. The one or more primary chromaticity values include the green chromaticity value, the blue chromaticity value, and the red chromaticity value. The method also includes determining a current yellow chromaticity value based at least partially upon the blue chromaticity value and the current white chromaticity value. The method also includes determining a current cyan chromaticity value based at least partially upon the red chromaticity value and the current white chromaticity value. The method also includes determining a current weighted light output value of the one or more primary colors based at least partially upon the red chromaticity value, the green chromaticity value, the blue chromaticity value, the current yellow chromaticity value, and the current cyan chromaticity value. The method also includes determining a set of preliminary light output value adjustments for the one or more primary colors to achieve a target white chromaticity value based at least partially upon the target weighted light output value of primary colors and the current weighted light output value of the primary colors. The method also includes determining a predicted color-adjusted white light output value based at least partially on the current white light output value and the preliminary light output value adjustments. The method also includes determining a light output value corrected set of adjustments for the primary colors to achieve the target white chromaticity value and the target white light output value. The method also includes modifying the light output value of the primary colors on the display device based at least partially upon the light output value corrected set of adjustments.

A system is also described herein. The system includes a photometer configured to measure a chromaticity value of a first primary color, a chromaticity value of a first secondary color, a chromaticity value of a second secondary color, a current white chromaticity value, and a current white light output value on a display device. The system also includes a computing system configured to perform operations. The operations include generating a plot of a color gamut triangle based at least partially upon the measured chromaticity value of the first primary color, the measured chromaticity value of the first secondary color, the measured chromaticity value of the second secondary color, and the measured current white chromaticity value. The operations also include determining a chromaticity value of a second primary color on the color gamut triangle based at least partially upon the measured chromaticity value of the first primary color, the measured chromaticity value of the first secondary color, the measured chromaticity value of the second secondary color, and the measured current white chromaticity value. The operations also include determining a chromaticity value of a third primary color on the color gamut triangle based at least partially upon the measured chromaticity value of the first primary color, the measured chromaticity value of the first secondary color, the measured chromaticity value of the second secondary color, and the measured current white chromaticity value. The operations also include modifying the light output value of the primary colors based at least partially upon the chromaticity value of the second primary color and the chromaticity value of the third primary color to produce a modified white chromaticity value and a modified white light output value on the display device.

DRAWINGS

The above and/or other aspects and advantages will become more apparent and more readily appreciated from the following detailed description of examples, taken in conjunction with the accompanying drawings, in which:

FIG. 9 is similar to FIG. 6, but with the X and Y axes transposed.

FIG. 10 is similar to FIG. 7, but with the X and Y axes transposed.

FIG. 11 is similar to FIG. 8, but with the X and Y axes transposed.

DETAILED DESCRIPTION

Figure 1:
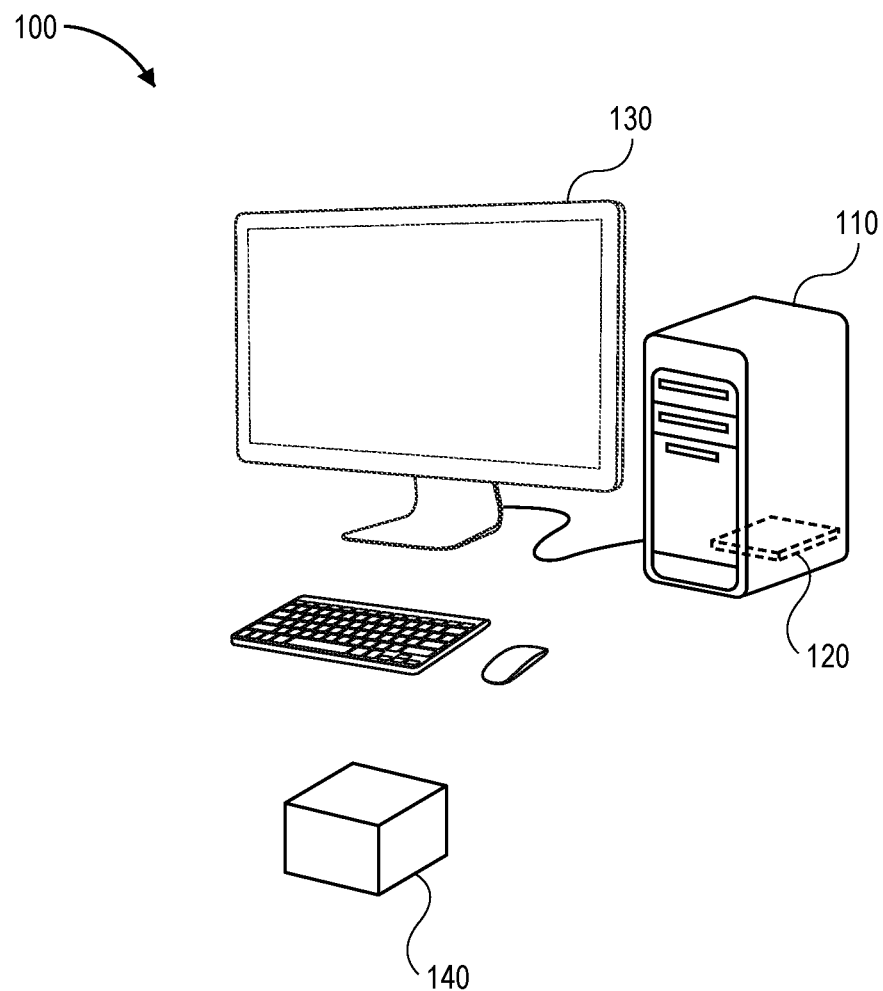
FIG. 1 illustrates a schematic view of a system for calculating a precise color mix on a multi (e.g., three) color display device, according to an implementation.

Exemplary aspects will now be described more fully with reference to the accompanying drawings. Examples of the disclosure, however, can be embodied in many different forms and should not be construed as being limited to the examples set forth herein. Rather, these examples are provided so that this disclosure will be thorough and complete, and will fully convey the scope to those skilled in the art. In the drawings, some details may be simplified and/or may be drawn to facilitate understanding rather than to maintain strict structural accuracy, detail, and/or scale.

It will be understood that when an element is referred to as being "on," "associated with," "connected to," "electrically connected to," or "coupled to" to another component, it may be directly on, associated with, connected to, electrically connected to, or coupled to the other component or intervening components may be present. In contrast, when a component is referred to as being "directly on," "directly associated with," "directly connected to," "directly electrically connected to," or "directly coupled to" another component, there are no intervening components present. As used herein, the term "and/or" includes any and all combinations of one or more of the associated listed items.

It will be understood that although the terms first, second, etc., may be used herein to describe various elements, components, and/or directions, these elements, components, and/or directions should not be limited by these terms. These terms are only used to distinguish one element, component, and/or direction from another element, component, and/or direction. For example, a first element, component, or direction could be termed a second element, component, or direction without departing from the teachings of examples.

Spatially relative terms, such as "beneath," "below," "lower," "above," "upper," and the like may be used herein for ease of description to describe the relationship of one component and/or feature to another component and/or feature, or other component(s) and/or feature(s), as illustrated in the drawings. It will be understood that the spatially relative terms are intended to encompass different orientations of the device in use or operation in addition to the orientation(s) depicted in the figures.

What is needed is an improved system and method for (e.g., directly) measuring primary colors (e.g., red, blue, or green) of a display with low luminance or illuminance, as well as making measurements and calculating a corresponding set of adjustments to primary color light output value to achieve a target combined white chromaticity and light output value with accuracy, speed, and proper resolution.

At their core, luminance and illuminance (also referred to herein as a luminance/illuminance or light output value(s)) are quantifiable measures of the amount of light present or observed. Luminance and illuminance are closely related for devices such as projectors. For a projector, illuminance may be the amount of light projected onto the screen at a given location, and luminance is the measure of the light that is reflected or diffused by that area of the screen, and what a user actually sees. For a device such as a computer monitor, only luminance is typically measured since this is considered a direct view device. The process and method may not depend upon which measure type is used, as long as consistency is maintained from start to finish for that process iteration. For example, the method may not select a target value in luminance, and then go use illuminance at the next step, unless a method to convert between the types is also included.

The systems and methods described herein are directed to multi (e.g., three) color display systems. These systems may display primary colors (e.g., red, green, and blue) in combination to generate mixes of color that, when spatially and temporally combined, give the appearance of mixed colors including white. The actual component colors (e.g., red, green, and blue) may have fixed chromaticity values determined by the specific light source(s) and filtering methods used to generate the primary colors, but the ratios or weightings of each component's light output value can be altered to achieve different mixes. This type of manipulation is referred to as changing the color gains. This may be used to change the color temperature (e.g., chromaticity value) and/or light output value of the resultant full white value that results from displaying all three component colors, and also impact the resultant secondary colors and tertiary colors that result from altering the mix ratios. A chromaticity value refers to an objective specification of color independent from its luminance or illuminance. That is to say, in lay terms, that it is a measure of color independent from how intense or "bright" something is. It can be provided in multiple objective forms of measure including CIE 1931 xyY or CIE 1964 xyY color space, which are based on their respective XYZ color spaces. These particular color spaces relate human perception of color to wavelengths of light in the visible spectrum. In both of these color spaces, the pair of x and y represent chromaticity as a two dimensional coordinate while Y represents quantifiable measures of the amount of light such as luminance. A luminance value may be commonly measured in foot-Lamberts (ft.-L) or candela per meter squared ($cd/m^2$). An illuminance value may be commonly measured in foot-candles (fcd) which is equivalent to lumens per square foot ($lm/ft^2$), or lux which is equivalent to lumen per meter squared ($lm/m^2$).

Mixing can also be used to perform a transformation of the output color when an input primary color request is made from a source device. In this example, the chromaticity of the component colors of the display device may be fixed, but an intermediate transform function may be applied between the source device and the display device to command an appropriate mix on request of what would otherwise be a primary component only.

The systems and methods described herein provide a deterministic approach to determine the appropriate color gains for a target full white chromaticity or color temperature, using the fewest number of real measurements that are easily permissible on a simulation display device (e.g., with low light output values). As used herein, low luminance and/or illuminance refer to values or scenarios described by the following cases:

Case 1: display devices operating at conditions such that white luminance is less than approximately 23.5 $cd/m^2$.

Case 2: display devices operating at conditions such that 2 of the fully saturated primary colors are less than 5 $cd/m^2$.

Case 3: display devices operating at conditions such that white illuminance is less than approximately 23.5 lux.

Case 4: display devices operating at conditions such that 2 of the fully saturated primary colors are less than 5 lux.

Case 5: display devices operating at conditions such that 2 of the fully saturated primary colors are each less than the measurement device's required light output value for repeatable and accurate measurement of chromaticity and light output value.

The systems and methods also describe how the color gains and/or the display's light source power controls can be (e.g., simultaneously) used to compensate for achieving a specific target overall light output value while still achieving the target white chromaticity.

FIG. 1 illustrates a schematic view of a system 100 for calculating a precise color mix on a multi-color (e.g., three) display device, according to an implementation. The system includes a computing system 110, a rendering device 120, a display device 130, and a photometer 140. The rendering device 120 can be part of the computing system 110 or separate from the computing system 110. The rendering device 120 can be or include a video or graphics card that is configured to render a color image. The display device 130 can be configured to receive and display the color image. For example, the display device 130 can be a screen/monitor of the computing system 110, a tablet, a smartphone, a television, a projector, or the like. The photometer 140 may be configured to measure the strength of electromagnetic radiation from the color image on the display device 130 in the range from ultraviolet to infrared and including the visible spectrum. More particularly, the photometer 140 can measure a distribution of strength to generate a color plus light output value. For example, the photometer 140 can directly measure wavelengths of emissions (i.e., a spectroradiometer type photometer), or it may use filters and photodetector types of sensors.

Determining Primary Colors on a Low Luminance and/or Illuminance Display

Calculating a precise color mix for a target white chromaticity on a three color display device 130 involves knowledge of the primary component colors' chromaticity. However, on display devices used for simulation or immersive environments, the illuminance and luminance of these individual component colors can be quite low, and outside of the measurable range of instrumentation when measured directly. Thus, it can be beneficial to determine the primary color's chromaticity without measuring each directly.

The example below assumes color luminance weighting in a full intensity white image. These values represent the percent contribution of each of the individual primary colors being combined to generate a white image.

TABLE 1

| Component color | Example percent contribution to luminance | Example component luminance (ft.-L) |
| --- | --- | --- |
| Red (R) | 21.26 | 1.2756 |
| Green (G) | 71.52 | 4.2912 |
| Blue (B) | 7.22 | 0.4332 |
| Total white makeup: | 100.00 | 6.0 |

In the case of a simulation display that outputs peak white luminance of 6 foot-Lamberts (ft.-L), this white color can be decomposed into the primary component colors' luminance based on the percent contribution of each color to the corresponding white. The numbers in the example in Table 1 are based on ITU-R BT.709's derivation of luminance signal which correlate to specific CIE 1931 chromaticity coordinates for all three primary colors and white.

A filter-based color and luminance meter used in simulation, the Konica Minolta CS-150 chroma meter, requires 5 candela per meter squared (cd/m$^2$) [1.46 ft.-L] of luminance for an accurate chromaticity reading, and greater than 10 cd/m$^2$ [2.92 ft.-L] for ideal repeatability. In the above example, it can be seen that the blue component is quite far from the minimum luminance threshold for the CS-150 to be used in direct measurement, and the red component is close, but also below the threshold for accurate readings. Only the green component color is readily measurable directly with any assurance of accuracy, along with the white mixed color. As a result, if the display holding all parameters equal were to display a solid blue image or a solid red image, and those color's chromaticity were measured directly by the instrumentation, the values may be inaccurate and may have poor repeatability.

Because the chromaticity of the component colors cannot be totally determined through direct measurement at these low luminance levels, the chromaticity may instead be determined indirectly. The CIE 1931 color space that describes chromaticity for a standard observer is developed specifically to allow for linear representation when mixing two colors. That is, when any two colors are mixed together with specific CIE 1931 coordinate values, the resulting color's chromaticity values (e.g., coordinates) can be found somewhere on a straight line drawn between the two original colors' coordinate locations. The range of colors that the display device 130 can generate is shown as a triangle in the CIE 1931 color space, where the vertices represent the CIE 1931 coordinates of the primary colors.

Figure 2:
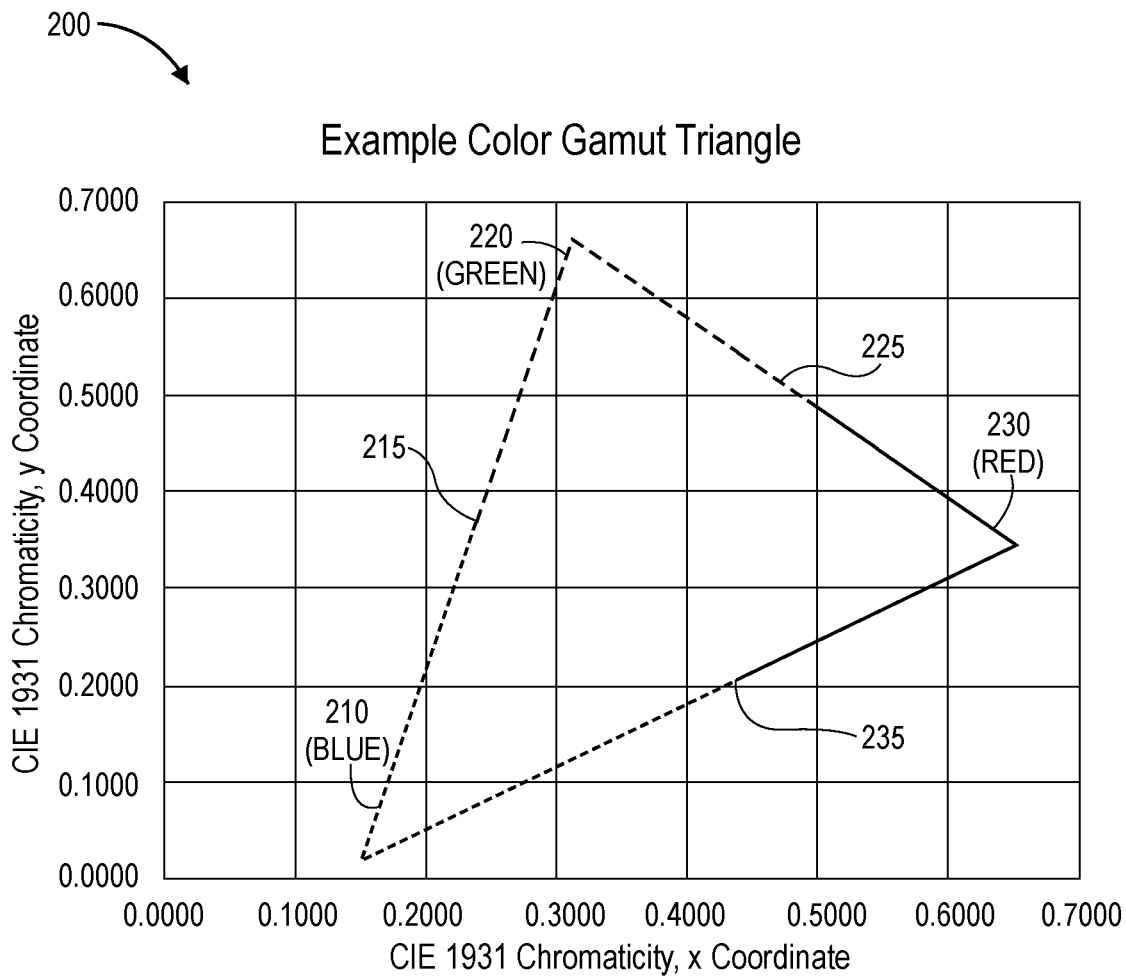
FIG. 2 illustrates a color gamut triangle, according to an implementation.

FIG. 2 illustrates a color gamut triangle 200, according to an implementation. The specific values represented in FIG. 2 correspond roughly to a prototype projector that was used when developing the method. Its form may vary from device to device. The vertices are the chromaticities for each of the 3 colors of the display. That display is capable of producing any color within the bounds of the triangle through mixing of the 3 colors in varying quantities. Subsequent sections and particularly FIG. 3 describe how to determine the three corners for a use case where some are too low of an intensity to measure directly.

The corner 210 is a first primary color (e.g., blue), the corner 220 is a second primary color (e.g., green), and the corner 230 is a third primary color (e.g., red). The side 215 transitions from blue to green. The side 225 transitions from green to red and includes yellow. The side 235 transitions from red to blue and includes magenta.

Based on the recognition of the color gamut triangle, conclusions may be drawn to aid in determining the currently unknown bounds of the triangle in the original example. A given white color can be considered a mixed color, which is described equally by all of the following cases so long as the color gains and resulting chromaticity and light output value of each of the following components/subcomponents are held constant between cases:

Case 1: Three Color Mix
  Component 1: Red
  Component 2: Green
  Component 3: Blue
Case 2: 2 Color Mix, Red+Cyan
  Component 1: Red
  Component 2: Cyan
    Subcomponent 1: Green
    Subcomponent 2: Blue
Case 3: 2 Color Mix, Green+Magenta
  Component 1: Green
  Component 2: Magenta
    Subcomponent 1: Red
    Subcomponent 2: Blue
Case 4: 2 Color Mix, Blue+Yellow
  Component 1: Blue
  Component 2: Yellow
    Subcomponent 1: Red
    Subcomponent 2: Green The above cases make use of secondary colors, which are the results of combining any two primary colors. The secondary color will have CIE 1931 chromaticity coordinates that lie somewhere on a linear line (e.g., side 215, 225, and/or 235) between the two primary colors (e.g., corners/colors 210, 220, and/or 230). The specific location is determined by the relative light output value of the respective primaries, but is not an equal proportion. When speaking of colors below, it is assumed full saturation.

A straight line can be drawn through the coordinates of red to green, and yellow will fall on that line.
A straight line can be drawn through the coordinates of green to blue, and cyan will fall on that line.
A straight line can be drawn through the coordinates of red to blue, and magenta will fall on that line.
A straight line can be drawn through the coordinates of red to cyan, and white will fall on that line.
A straight line can be drawn through the coordinates of green to magenta, and white will fall on that line.
A straight line can be drawn through the coordinates of blue to yellow, and white will fall on that line.
Exact white coordinate is the mutual intersection location of the lines described in one or more of the prior bullet points (e.g., the three prior bullet points).

In the previous example, considering the secondary color generated by combining the maximum luminance of the highest intensity primary color (e.g., green), and the lowest level primary color (e.g., blue), the resultant combined intensity may be a moderate value that exceeds the minimum luminance requirements of the instrumentation previously described. Similarly, if the maximum luminance of the highest intensity primary color (e.g., green) and the middle intensity primary color (e.g., red) are combined, the result exceeds the threshold for accuracy.

That is to say, the system can accurately measure at least two of the fully saturated secondary colors (e.g., yellow and cyan), and one of the original primary colors (e.g., green), as well as a full output white where all three primaries are mixed.

From this information, as long as the intensities and chromaticity of each of the primaries remain constant for a limited interval during the measurements, the system may establish a full color gamut triangle including the primaries that are not measured directly.

Figure 3:
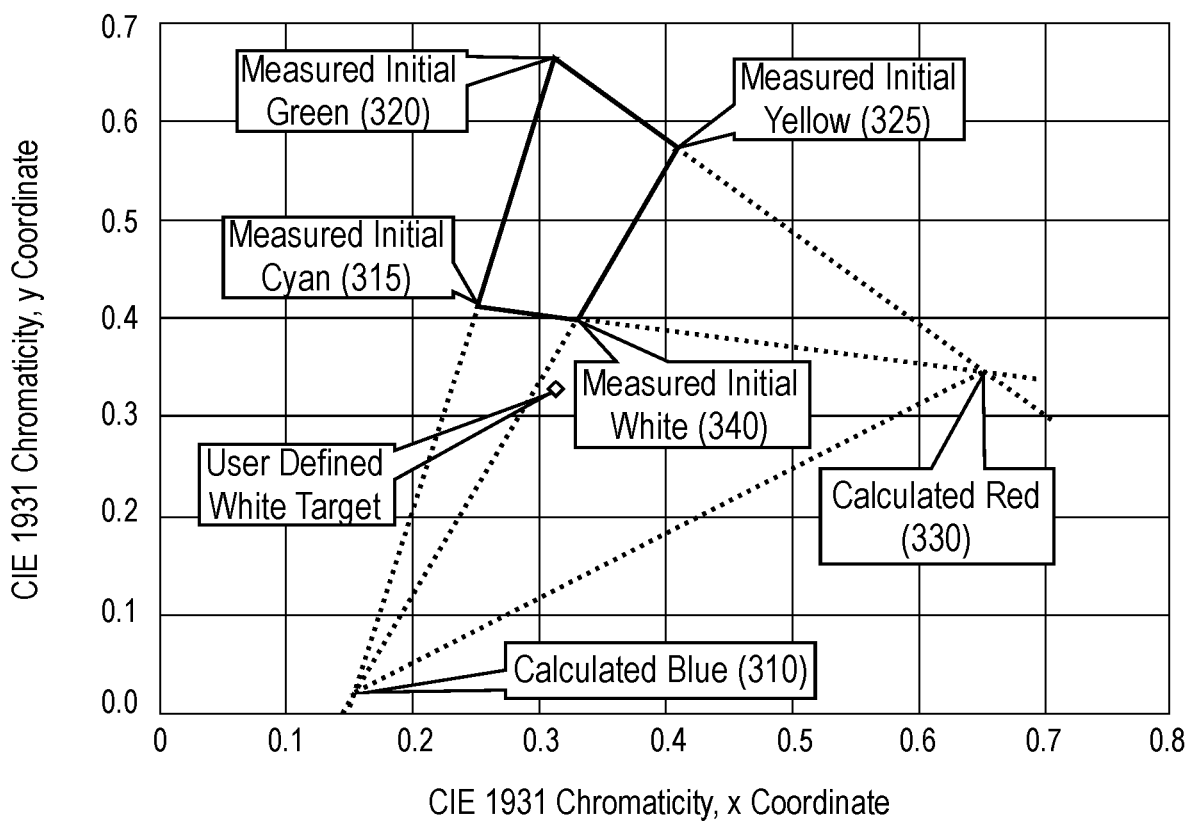
FIG. 3 illustrates the color gamut triangle showing how the geometry may be used to determine the primary color chromaticity, according to an implementation.

FIG. 3 illustrates the color gamut triangle 200 showing how the geometry may be used to determine the primary color chromaticity, according to an implementation. The process of determining the values is described as:

Measure the basic data (in any order)
  Measure the CIE 1931 chromaticity coordinates (x, y) of green 320.
  Measure the CIE 1931 chromaticity coordinates (x, y) of cyan 315.
  Measure the CIE 1931 chromaticity coordinates (x, y) of yellow 325.
  Measure the CIE 1931 chromaticity coordinates (x, y) of white 340, and the light output value of white.
  Red 330 is determined as the intersection location of 2 lines:
    i. A line passing through white 340 and cyan 315
    ii. A line passing through green 320 and yellow 325
  Blue 310 is determined as the intersection location of 2 lines:
    i. A line passing through white 340 and yellow 325
    ii. A line passing through green 320 and cyan 315

Calculating Deterministic Color Gains

Once the display device's 130 actual primary color coordinates have been determined, it becomes possible to examine a target case compared to the current case. From a known target saturated white chromaticity and the primary colors' chromaticity, the computing system 110 can determine the percent contribution that each color would need to have in terms of light output value or color gain. Similarly, the current percent contribution of each color to fully saturated white can be examined based on a current measurement of white and the primary colors' chromaticity. Once both a target percent contribution and current percent contribution is established for each color, the computing system 110 can actively adjust the display device's 130 color gains to scale the native output light output value of the display device to the appropriate levels.

Calculating the Target Color Mix

In a similar manner to how the actual display device's 130 primaries are calculated from current secondary colors plus white, the computing system 110 can do essentially the reverse to determine a targeted secondary from the actual primaries plus white.

Figure 4:
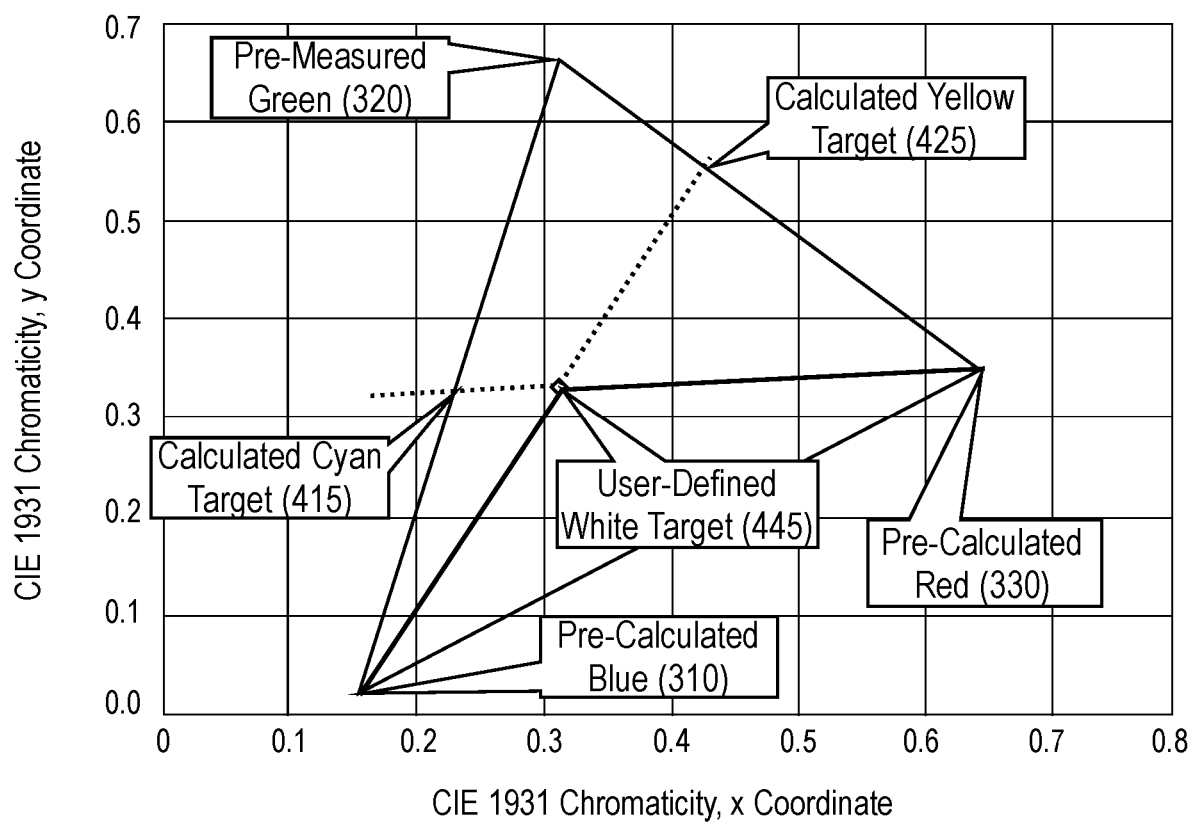
FIG. 4 illustrates the color gamut triangle showing how the geometry may be used to determine the chromaticity coordinates of two of the secondary colors for the corresponding target white point, according to an implementation.

FIG. 4 illustrates the color gamut triangle 200 showing how the geometry may be used to determine the chromaticity coordinates of two of the secondary colors for the corresponding target white point, according to an implementation. For example, cyan and yellow may be selected, but magenta could be selected as an alternate.

Target (chromaticity value of secondary color) Cyan 415 is determined as the intersection location of 2 lines:
  A line passing through target white 445 and red 330
  A line passing through green 320 and blue 310
Target (chromaticity value of secondary color) Yellow 425 is determined as the intersection of 2 lines:
  A line passing through target white 445 and blue 310
  A line passing through green 320 and red 330
Target Magenta (not shown) is determined as the intersection of 2 lines:
  A line passing through target white 445 and green 320
  A line passing through blue 310 and red 330

Once the target secondary color chromaticities are found, this can be decomposed into the overall contributions needed, in terms of light output value from each color relative to full saturated white's light output value, given their specific chromaticity coordinates in order to form the target white chromaticity. The values obtained in the previous sentence may be referred to as the target weighted light output value. For example, this process uses a system of equations leveraging color mixing equations, the known primary color chromaticities, the target secondary color chromaticities, and/or recognition that white light output value is composed of the sum of each primary color's light output value.

Calculating the Current Color Mix

The foregoing description has established the goal color mix of the system 100 in terms of each primary color's light output value contribution to a white color based on the set of primary color chromaticities. The following describes the process to determine the current color mix using the same functions, but with different inputs, namely using a current white measurement (e.g., chromaticity value and/or light output value) rather than a targeted value. This process may be a portion of an iterative loop, so it may use new input variables corresponding to new measurements of white. The first iteration of the loop may use the initial values measured earlier. In another implementation, the current cyan and yellow values may be measured directly and used as inputs.

Figure 5:
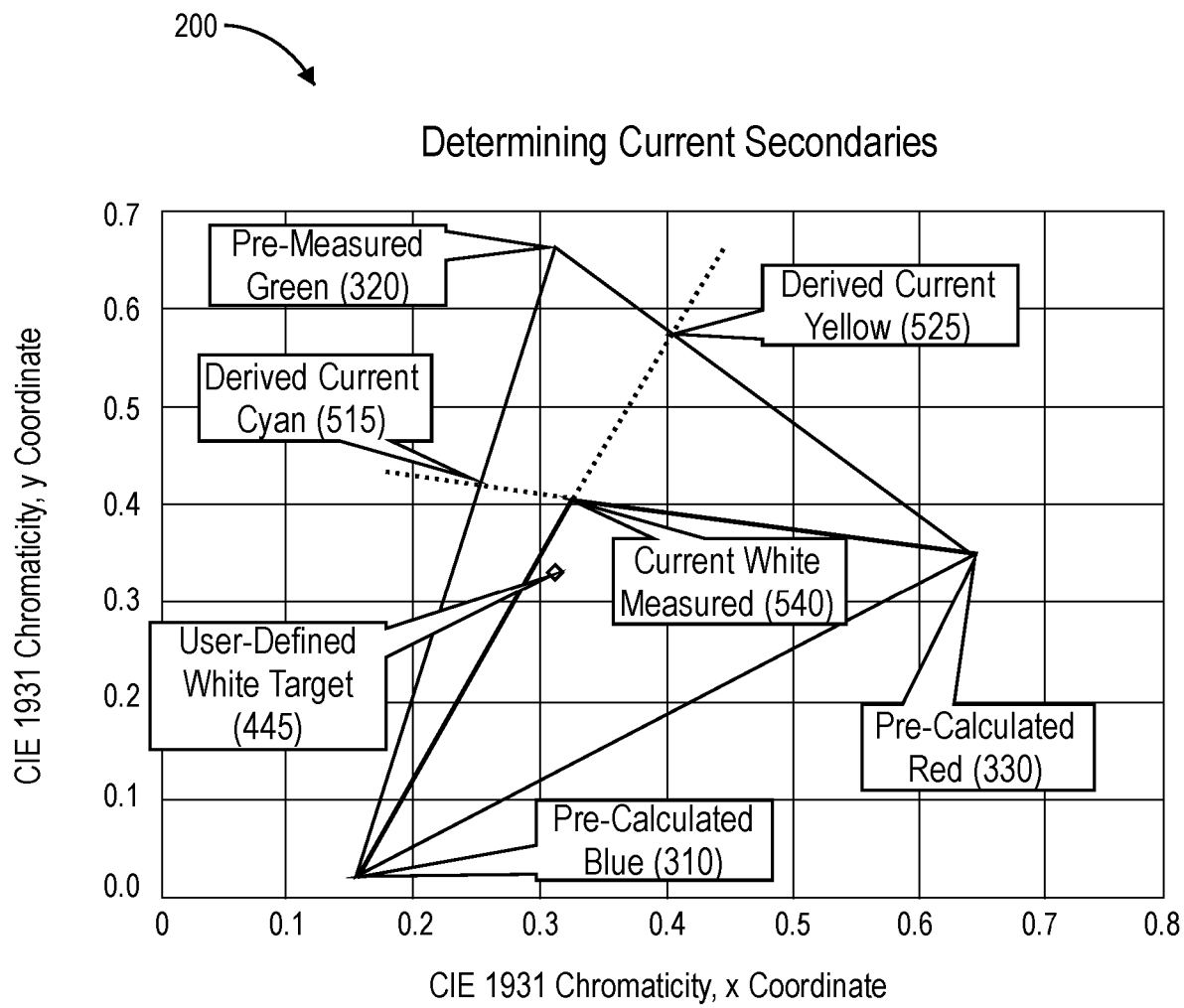
FIG. 5 illustrates the color gamut triangle showing how the geometry may be used to determine the derived chromaticity coordinates of two of the secondary colors for the corresponding current white point, according to an implementation.

FIG. 5 illustrates the color gamut triangle 200 showing how the geometry may be used to determine the derived chromaticity coordinates of two of the secondary colors for the corresponding current white chromaticity, according to an implementation. For example, cyan and yellow may be selected, but magenta could be selected as an alternate.

Cyan 515 is determined as the intersection location of 2 lines:
  A line passing through current white 540 and red 330
  A line passing through green 320 and blue 310
Yellow 525 is determined as the intersection of 2 lines:
  A line passing through current white 540 and blue 310
  A line passing through green 320 and red 330
Magenta (not shown) is determined as the intersection of 2 lines:
  A line passing through current white 540 and green 320
  A line passing through blue 310 and red 330

Once the current secondary color chromaticities are found, this can be decomposed into the overall current contributions, in terms of light output value from each color relative to full saturated white's light output value, given their specific chromaticity coordinates in order to form the current white chromaticity. The values obtained in the previous sentence may be referred to as a current weighted light output value. For example, this process uses a system of equations leveraging color mixing equations, the known primary color chromaticities, the current secondary color chromaticities, and/or recognition that white light output value is composed of the sum of each primary color's light output value.

Consideration of Control Encoding and Current Values

In the preceding sections, the target color mix values were calculated, and the current actual output mix values were calculated; both leveraging linear geometry afforded by the nature of the CIE 1931 xyY color space, color mixing equations, and systems of equations. In the following sections, this can be combined to determine an actual change to the color gains; however, the display controls being utilized may be used to adjust the color gains, and recognition of their current settings may be required.

Controls for color gains may have several different encoding schemes depending on the display device 130. The following is a list of some parameters that can be used when it comes to color gain controls and the transfer function between the display controls and the actual light output value outputs:

What controls are available
- Control over only color gains
- Controls over color gains plus an overall display light source control such as backlight or diode power that impacts all colors The transfer function shape between the input control and the actual light output value(s)
- Linear shaped
- 2.2 Power function or other Gamma/Electro-Optical Transfer Function including inverse gamma
- Other The transfer function extents and the controls extents
- Any offset values
- Minimum and maximum controls
- Minimum and maximum relative output illuminance/luminance compared to peak output for the control range (including black level)
- Whether any other controls impact the color gain controls
- Whether controls are repeatable
  - Light can typically only be removed when working on color gains, but some manufacturers give some ability to add light that may have been removed based on other calibrations. This "overhead" amount that is accessible may not be repeatable.

Tables may be generated, such as relative light output value compared to input color gain control, and values may then be looked up from the tables, rather than explicitly developing equations for the transfer functions. This may make the method of determining the relative output agnostic to specific display devices, and only table changes would be required for application to different display types.

Example 1

In this example, the display device 130 is a projector and projection screen combination who has controls with the following parameters:
Projector does not have capability for light source power control
Independent red, green, and blue gain controls
  Control Input Range: −4096 to 0 integer values
  Relative Luminance Output per Control: 0% to 100%
  Black level is close enough to 0% of maximum to ignore it
  2.2 Power function relating gain control to relative luminance from minimum to maximum The above parameters may be used to populate tables for each, based on the corresponding equation.

Figure 6:
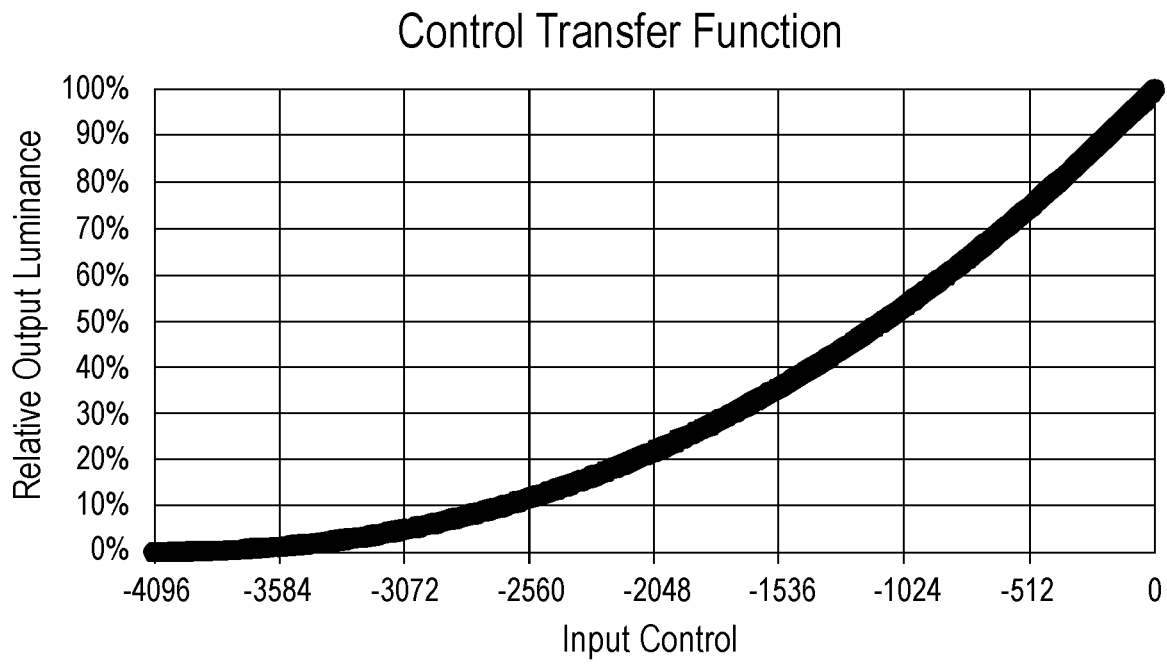
FIG. 6 illustrates a gain control transfer function mapping a display device's controls to a corresponding luminance output, according to an implementation.

FIG. 6 illustrates a graph of a control transfer function, according to an implementation. As mentioned above, tables of outputs may be generated, and values may be looked up from the tables rather than explicitly developing equations for the transfer functions. This may make the method of determining the relative output agnostic to specific display devices, and only table changes would be required for application to different display types.

Example 2

Figure 7:
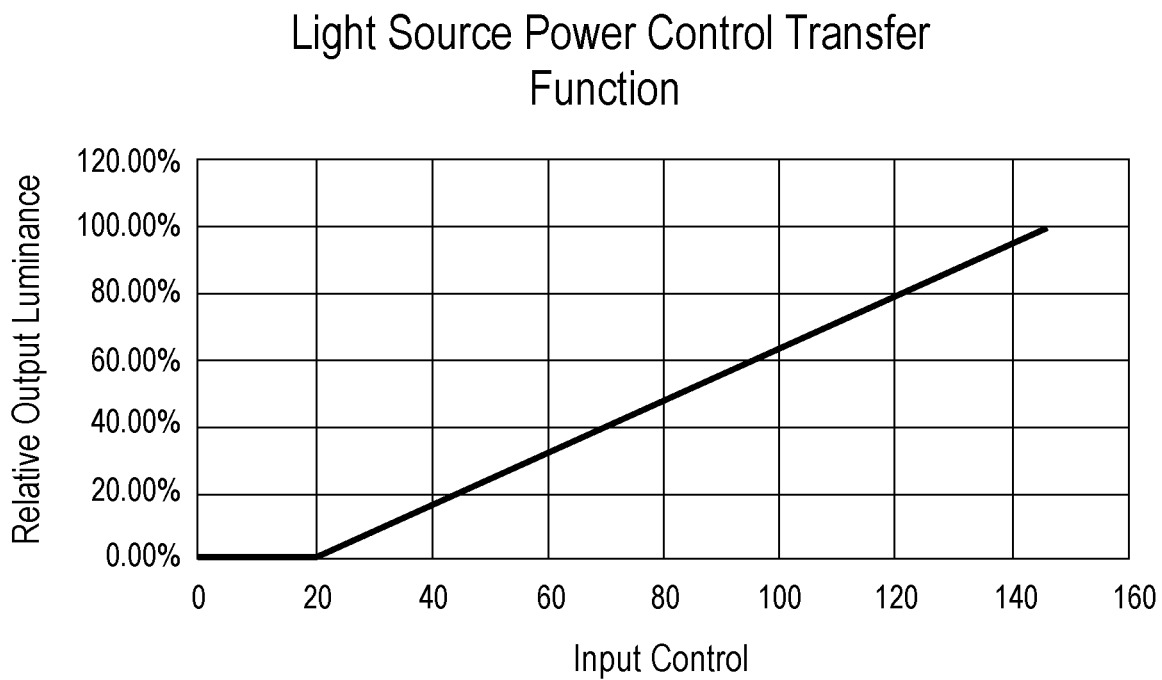
FIG. 7 illustrates a transfer function for the light source power control mapping a display device's controls to a corresponding luminance output, according to an implementation.
Figure 8:
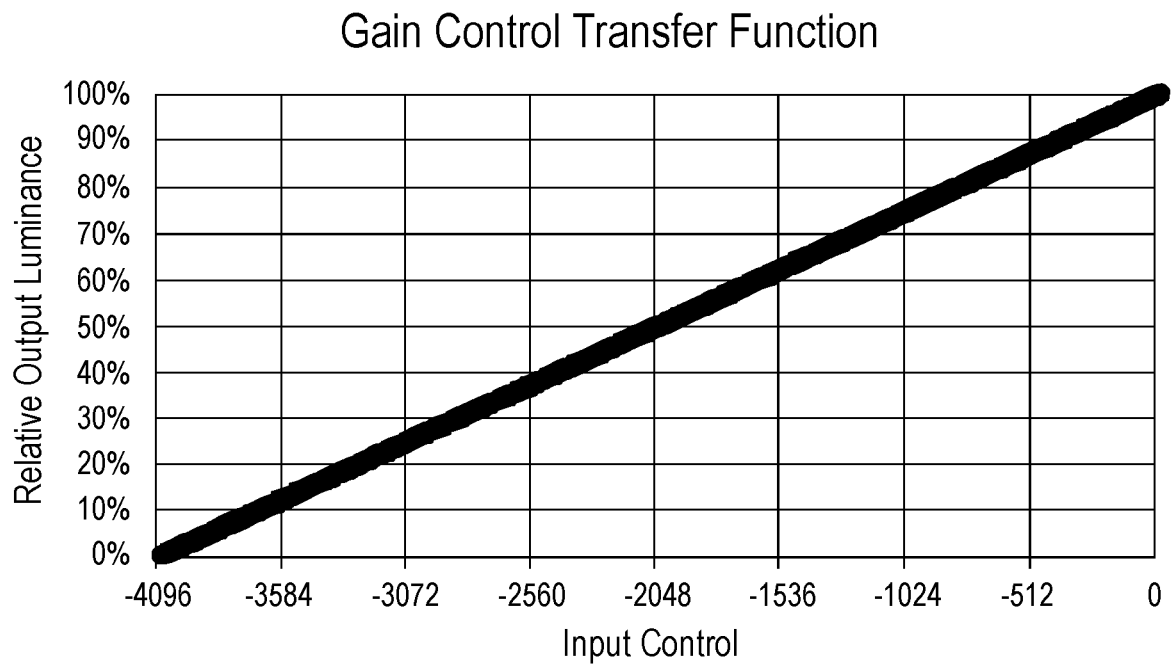
FIG. 8 illustrates another gain control transfer function mapping a display device's controls to a corresponding luminance output (e.g., an alternative to FIG. 6), according to an embodiment.

In this example, the display device 130 is a projector and projection screen combination who has controls with the following parameters:
Display has capability for independent light source power control
  Control Input Range: 0 to 146
  Relative Luminance Output: 0% to 100%
  0% relative luminance output from light source power control value 0 to 20
  Linear shape from input values 20 to 146
Independent Red, Green, and Blue Gain Controls
  Control Input Range: −4096 to 0 integer values
  Relative Light Output per Control: 0% to 100%
  Black level is close enough to 0% of maximum to ignore it
  1.0 Linear Power function relating gain control to relative light output from minimum to maximum The above parameters can be used to populate tables for each, based on the corresponding equation. With such a display, the transfer function for the light source power control would appear as shown in FIG. 7. With such a display, the transfer function for the gain controls would appear as shown in FIG. 8.

Determining the Change in Color Gain Based on Current Values

The target color weighting, the current color weighting, and the relative output currently can be based on the current input controls of the display device 130. From this information, the computing system 110 can determine a relative increase or decrease to each color to achieve the target white chromaticity. This data at this step may not be normalized.

The data may be re-normalized to fit within control ranges of the display device. The target white chromaticity is an outcome with 2 parameters, and there are potentially three or more variables, related to the three primary colors. For this reason, there are multiple solutions. The computing system 110 can normalize to the control value closest to maximum in an effort to maximize the dynamic range of the display device 130 while fitting within the limits of the display device controls. This may result in an uncontrolled light output value, but correct chromaticity. These values are unscaled until modified for proper light output value.

Determining the Unscaled Expected Light Output Value

The weightings for each of the colors have been calculated above. The weightings can be re-encoded to the display device color gain controls to yield theoretically correct chromaticity of the full white. To control the light output value, the computing system 110 can consider the last light output value reading, consider what the adjustments to color gains will do to overall white light output value, and consider the controls available on the display device 130.

The computing system 110 can start by calculating what the values so far will do to the expected light output value. The computing system 110 can also determine what the expected light output value is for each primary color, because each may have a different recommended amount of change. The computing system 110 can then determine that white light output value is the sum of the primary colors' light output value.

Scaling for Light Output Value

Once the computing system 110 has determined the unscaled expected light output value, the computing system 110 may consider how to best modify (e.g., correct) it using the available controls on the display device 130. This may include lowering the overall light output value of the recommended change without changing the would-be chromaticity. In order for this to occur, the computing system 110 can hold the relative contributions of each color to each other constant. That is, the computing system 110 can apply any changes as a scale factor evenly to all three primary colors' light output value, which are controlled by color gains.

The computing system 110 can also consider what controls are available on the display device 130. For maximum dynamic range of the display device 130, the amount of adjustment performed in the color gains may be minimized. In fact, the computing system 110 and/or display device 130 can include a function specifically to equally lower the light output value of all colors (e.g., simultaneously). This can be done by dimming the common light source used by each color upstream of any filtering used to generate the actual color. For example, in a laser-phosphor projector with Red, Green, and Blue (RGB) primary colors, the laser and phosphor combination can generate light. More particularly, it can generate a common set of light that is passed through sets of dichroic filters and beam splitters to generate the individual red, green, and blue lights. By adjusting the power to the laser-phosphor system, all 3 colors' light output value can be changed in unison on a continuous basis. This may be used to scale the light output value in the calibration model. This may be referred to as light source power control.

Light Source Power Control

In the case of the display device 130 having light source power controls, the scaled color gain values can be the same as the unscaled values. The light source power control value can be scaled by itself. In some implementations, the light source power control may be available but inadequate for achieving targeted values, or not offer enough control granularity to achieve implementation required accuracy. An appropriate error handle can be developed for such an occurrence based on the desired overall system operation to provide a combination of light source power controls and scaling color gains.

Scaling Color Gains

In the case of the display device 130 lacking light source power control, the approach to scaling the light output value can include scaling all of the colors according to a ratio between the unscaled expected value and the target value.

Remapping Values into Encoded Controls

Now that the recommended amount of each color relative to its maximum output has been determined and scaled, this can be re-mapped into an encoded control value to send to the display device 130. The same encoding transfer function can be used in reverse to obtain the appropriate control based on the desired outputs.

Example 1 (Continued)

Figure 9:
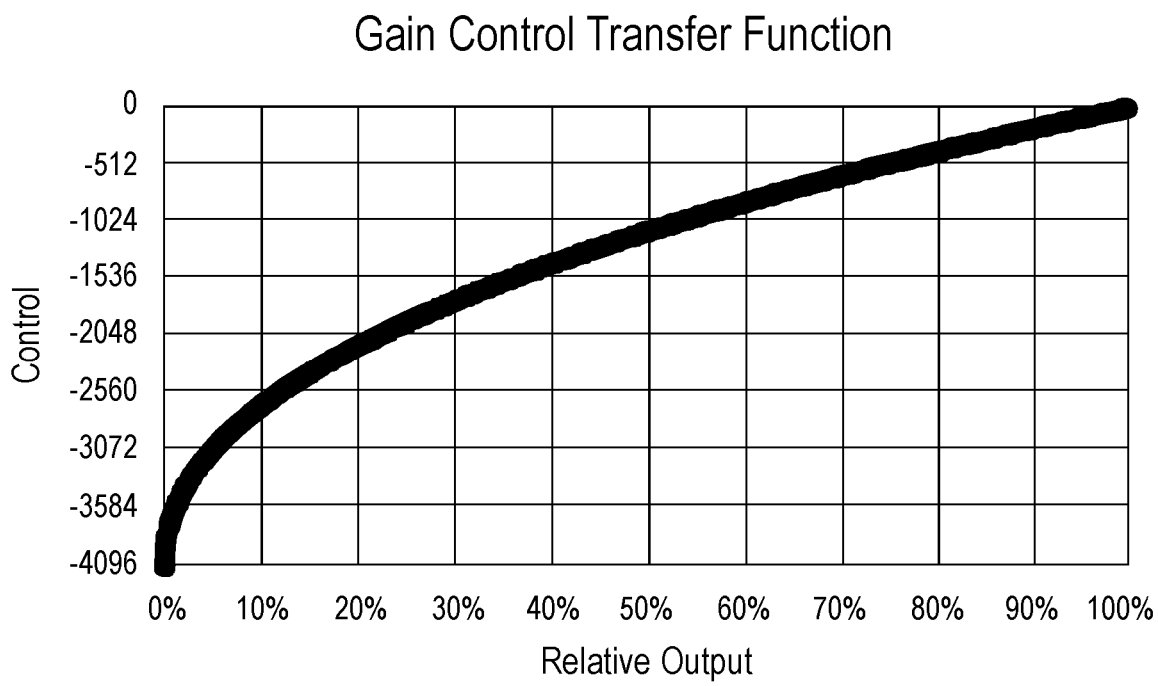
FIG. 9 illustrates another gain control transfer function, according to an implementation. More particularly.

Reconfiguring the transfer function equation given there for the example display device 130, a real control value can be determined to command for each color, simultaneously. FIG. 9 illustrates a graph of a gain control transfer function, according to an implementation. The transfer function is the same but with the axis transposed.

Example 2 (Continued)

Figure 10:
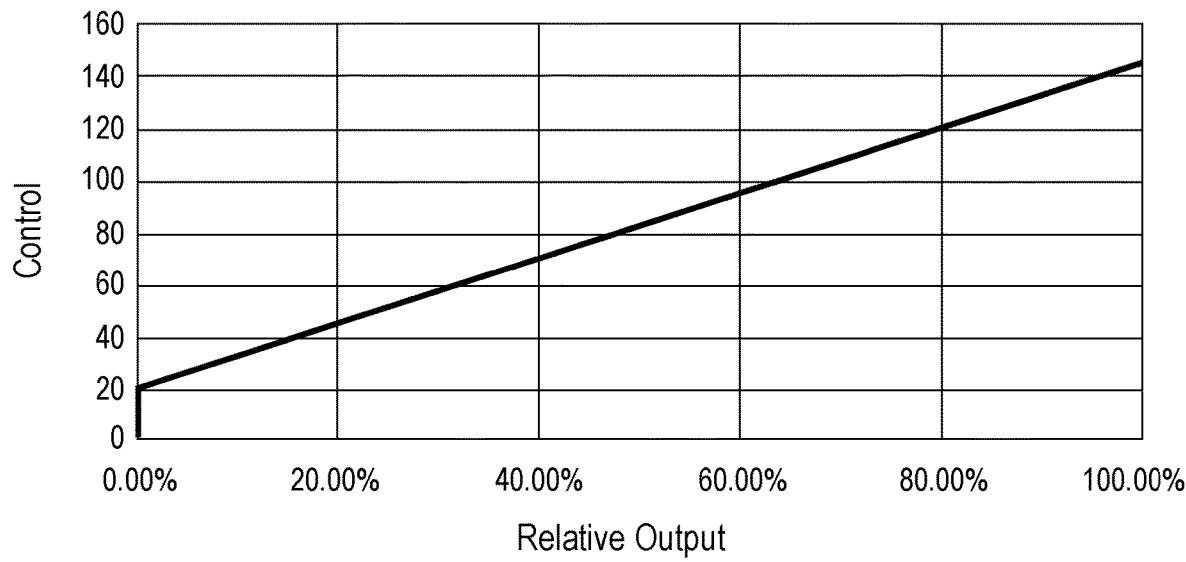
FIG. 10 illustrates another transfer function for the light source power control, according to an implementation. More particularly.
Figure 11:
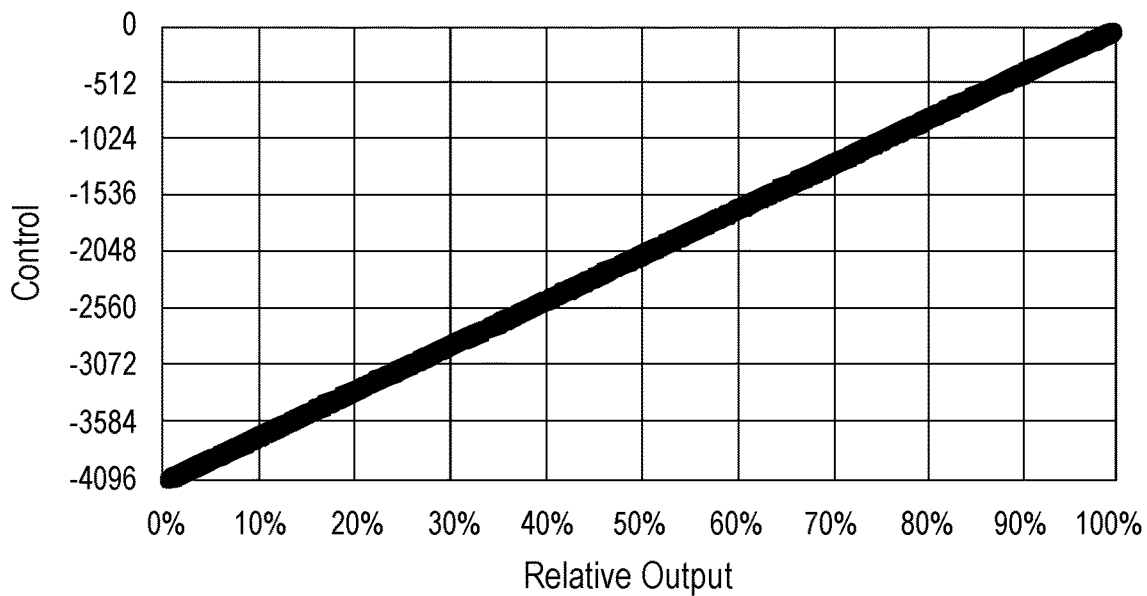
FIG. 11 illustrates another gain control transfer function, according to an implementation. More particularly.

Reconfiguring the transfer function equation given there for the example display device 130, a real control value can be determined to command for each color as well as light source power control, simultaneously. FIG. 10 illustrates a graph of a light source power control transfer function, and FIG. 11 illustrates a graph of a gain control transfer function, according to an implementation. The transfer function is the same for both functions as the preceding section, but with the axis transposed.

Applying the Result, Checking, and Iterating

Once the computing system 110 has determined a scaled result and applied encoding for each of the colors as well as light source power control (if available), the computing system 110 may then apply the newly determined parameters to the display device 130. The computing system 110 can transmit the controls to the display device 130. The same white pattern can then be re-measured with the newly applied gains and light source power control values, and the pattern may be compared against the target values. If the pattern is not within a predetermined threshold of the target values, the process may loop back around to "calculating the current color mix." The steps prior to this one may only be performed a single time to determine initial values and targets. This loop process while incurring several calculations and multiple variables only requires the new white chromaticity and light output value measurements for processing through to yet another end result.

Sources of Error and Compensation

This calibration process can be fully deterministic, and theoretically exact when considering idealized systems without error. However, in real practice, there can be sources of error to be compensated for in the model or error corrected. In one implementation, the error can be compensated for through iteration. The process described above is a convergent solution when including variances in real world devices such as:

Minor to moderate display gamma inaccuracies
Minor to moderate errors in controls encoding
Minor to moderate accuracy and repeatability errors in photometers The solution is convergent due to the way the portions within the iterative loop are built. More particularly, they can utilize the current display control parameters, calculate an error between desired state and current state, and determine a next set of control parameters based on the combination.

Method

Figure 12:
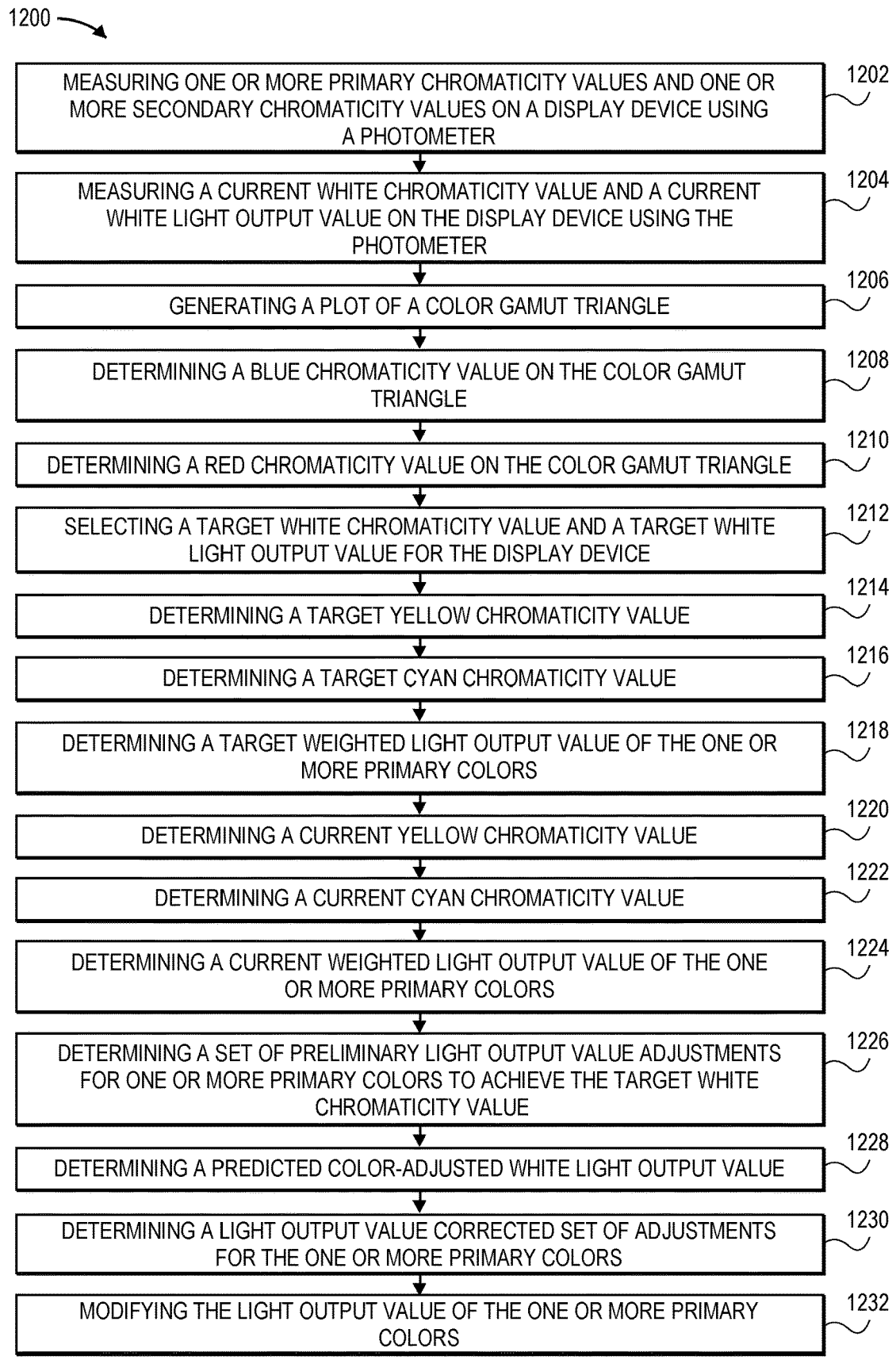
FIG. 12 illustrates a flowchart of a method for determining a color mix for a target white chromaticity value and a target white light output value on a three color display device with low luminance or illuminance, according to an implementation.

FIG. 12 illustrates a flowchart of a method 1200 for determining and/or achieving a color mix for a target white chromaticity value and a target white light output value (also referred to as a luminance/illuminance value) on a three color display device 130 with low luminance or illuminance, according to an implementation. In an example, low luminance and/or illuminance may refer to a luminance of the display device 130 being less than 23.5 cd/m^2, an illuminance of the display device 130 being less than 23.5 lux, or both. An illustrative order of the method 1200 is provided below; however, one or more steps of the method 1200 can be performed in a different order, combined, split into sub-steps, repeated, or omitted.

As used herein, a "value" may refer to a discrete number or a range of numbers. Specific values/numbers for both parameters may be determined by a user or application before the process starts. For example, an application may input into a software system before starting the process that it wants a chromaticity of (x=0.312, y=0.329) and luminance of 10.0 fL. This is the basis for the 'target' values. Another application might want (0.310, 0.370) and 15.0 fL. The process itself determines the current state and the necessary control changes to get to the target state.

The method 1200 includes measuring one or more primary chromaticity values and one or more secondary chromaticity values on a display device 130 using a photometer 140, as at 1202. The primary chromaticity values can be or include red, blue, and green. The secondary chromaticity values can be or include cyan, yellow, and/or magenta. Thus, in an example, the chromaticity values that are measured can include cyan, yellow, and green.

The method 1200 also includes measuring a current white chromaticity value and a current white light output value on the display device 130 using the photometer 140, as at 1204.

The method 1200 also includes generating a plot of a color gamut triangle 200 based at least partially upon the measured cyan, yellow, green, and current white chromaticity values, as at 1206.

The method 1200 also includes determining a blue chromaticity value on the color gamut triangle based at least partially upon the cyan, yellow, green, and current white chromaticity values, as at 1208. In one implementation, determining the blue chromaticity value can include determining a first line on the plot based at least partially upon the yellow and current white chromaticity values, determining a second line on the plot based at least partially upon the cyan and green chromaticity values, and determining the blue chromaticity value on the color gamut triangle based at least partially upon an intersection of the first and second lines The method 1200 also includes determining a red chromaticity value on the color gamut triangle based at least partially upon the cyan, yellow, green, and current white chromaticity values, as at 1210. In one implementation, determining the red chromaticity value can include determining a third line on the plot based at least partially upon the cyan and current white chromaticity values, determining a fourth line on the plot based at least partially upon the yellow and green chromaticity values, and determining the red chromaticity value on the color gamut triangle based at least partially upon an intersection of the third and fourth lines The method 1200 can also include selecting a target white chromaticity value and a target white light output value for the display device 130, as at 1212.

The method 1200 can also include determining a target yellow chromaticity value based at least partially upon the blue chromaticity value and the target white chromaticity value, as at 1214. In one implementation, determining the target yellow chromaticity value may include determining a fifth line on the plot based at least partially upon the blue chromaticity value and the target white chromaticity value, and the target yellow chromaticity value is at an intersection of the fifth line and the color gamut triangle.

The method 1200 can also include determining a target cyan chromaticity value based at least partially upon the red chromaticity value and the target white chromaticity value, as at 1216. In one implementation, determining the target cyan chromaticity value may include determining a sixth line on the plot based at least partially upon the red chromaticity value and the target white chromaticity value, and the target cyan chromaticity value is at an intersection of the sixth line and the color gamut triangle.

The method 1200 can also include determining a target weighted light output value of one or more primary colors based at least partially upon the target yellow chromaticity value and the target cyan chromaticity value, as at 1218. The weighted light output value refers to the relative light output value of each of the primary colors compared to the total light output value of the white color, for a particular white chromaticity value, and expressed as a percentage. The sum of the primary color's weighted light output value can sum to a value of 100%. The primary colors may be or include green, blue, red, or a combination thereof.

The method 1200 can also include determining a current yellow chromaticity value based at least partially upon the blue chromaticity value and the current white chromaticity value, as at 1220. In one implementation, determining the current yellow chromaticity value may include determining a seventh line on the plot based at least partially upon the blue chromaticity value and the current white chromaticity value, and the current yellow chromaticity value is at an intersection of the seventh line and the color gamut triangle.

The method 1200 can also include determining a current cyan chromaticity value based at least partially upon the red chromaticity value and the current white chromaticity value, as at 1222. In one implementation, determining the current cyan chromaticity value may include determining an eighth line on the plot based at least partially upon the red chromaticity value and the current white chromaticity value, and the current cyan chromaticity value is at an intersection of the eighth line and the color gamut triangle The method 1200 can also include determining a current weighted light output value of the one or more primary colors based at least partially upon the current yellow chromaticity value and the current cyan chromaticity value, as at 1224.

The method 1200 can also include determining a set of preliminary light output value adjustments for the one or more primary colors to achieve the target white chromaticity value based at least partially upon the target weighted light output value and the current weighted light output value, as at 1226. The preliminary light output value adjustments may be or include adjustments or potential adjustments to display controls such as color gain in order to achieve the target white chromaticity, but not necessarily the target white light output value. Color gains for purposes herein are display parameters that adjust the potential output of a corresponding color's light output value individually and when used as part of a mixed color such as white.

The method 1200 can also include determining a predicted color-adjusted white light output value based at least partially on the current white light output value and the preliminary light output value adjustments, as at 1228. The predicted color-adjusted white light output value refers to a calculated outcome of the white color's light output value based on the set of potential adjustments to display controls such as color gains. They can be calculated by comparing current control settings to the potential adjustments, calculating the expected change in each primary color's light output value, and summing each primary color's new expected light output value to produce the predicted color-adjusted white light output value.

The method 1200 can also include determining a light output value corrected set of adjustments for the one or more primary colors, as at 1230. The light output value corrected set of adjustments may be used to achieve the target white chromaticity and/or the target white light output value. The light output value corrected set of adjustments may be based at least partially upon the target white light output value (from 1212) and/or the predicted color-adjusted white light output value (from 1228).

The method 1200 can also include modifying the light output value of the one or more primary colors based at least partially upon the light output value corrected set of adjustments, as at 1232. Modifying the light output value of the one or more primary colors can include simultaneously modifying the light output value of three primary colors using display controls as well as an overall device light output value control. The overall device light output value control is a control that impacts a common source of light used by all of the primary colors of the display device, such as a backlight or lamp through means of manipulating its provided power. This can produce a modified white chromaticity value, a modified white light output value, or both a modified white chromaticity value and a modified white light output value on the display device 130. For example, as shown in FIG. 5, the white chromaticity value may begin as reference number 540, and when modified, arrive closer to (or at) reference number 445.

While the foregoing disclosure has been described in some detail by way of illustration and example for purposes of clarity and understanding, it will be clear to one of ordinary skill in the art from a reading of this disclosure that various changes in form and detail can be made without departing from the true scope of the disclosure and may be practiced within the scope of the appended claims. For example, all the methods, systems, and/or component parts or other aspects thereof can be used in various combinations. All patents, patent applications, websites, other publications or documents, and the like cited herein are incorporated by reference in their entirety for all purposes to the same extent as if each individual item were specifically and individually indicated to be so incorporated by reference.

What is claimed is:

1. A method for achieving a target white chromaticity value and a target white light output value on a display device, the method comprising:
    measuring a chromaticity value of a first primary color, a chromaticity value of a first secondary color, and a chromaticity value of a second secondary color on the display device using a photometer;
    measuring a current white chromaticity value and a current white light output value on the display device using the photometer;
    generating a plot of a color gamut triangle based at least partially upon the measured chromaticity value of the first primary color, the measured chromaticity value of the first secondary color, the measured chromaticity value of the second secondary color, and the measured current white chromaticity value;
    determining a chromaticity value of a second primary color on the color gamut triangle based at least partially upon the measured chromaticity value of the first primary color, the measured chromaticity value of the first secondary color, the measured chromaticity value of the second secondary color, and the measured current white chromaticity value;
    determining a chromaticity value of a third primary color on the color gamut triangle based at least partially upon the measured chromaticity value of the first primary color, the measured chromaticity value of the first secondary color, the measured chromaticity value of the second secondary color, and the measured current white chromaticity value;
    determining a target chromaticity value of the first secondary color based at least partially upon the chromaticity value of the third primary color and the target white chromaticity value;
    determining a target chromaticity value of the second secondary color based at least partially upon the chromaticity value of the second primary color and the target white chromaticity value; and
    modifying a light output value of the primary colors based at least partially upon the chromaticity value of the second primary color, the chromaticity value of the third primary color, the target chromaticity value of the first secondary color, and the target chromaticity value of the second secondary color to produce a modified white chromaticity value and a modified white light output value on the display device.

2. The method of claim 1, wherein the first primary color comprises green, the second primary color comprises blue, and the third primary color comprises red.

3. The method of claim 2, wherein the first secondary color comprises cyan or magenta, and the second secondary color comprises yellow or magenta.

4. The method of claim 1, further comprising determining a target weighted light output value of one or more of the primary colors based at least partially upon the target chromaticity value of the first secondary color and the target chromaticity value of the second secondary color,
    wherein the light output value of one or more of the primary colors is modified based at least partially upon the target weighted light output value.

5. The method of claim 1, further comprising:
    determining a current chromaticity value of the first secondary color based at least partially upon the chromaticity value of the third primary color and the current white chromaticity value; and
    determining a current chromaticity value of the second secondary color based at least partially upon the chromaticity value of the second primary color and the current white chromaticity value,
    wherein the light output value of one or more of the primary colors is modified based at least partially upon the current chromaticity value of the first secondary color and the current chromaticity value of the second secondary color.

6. The method of claim 5, further comprising determining a current weighted light output value of one or more of the primary colors based at least partially upon the current chromaticity value of the first secondary color and the current chromaticity value of the second secondary color,
    wherein the light output value of one or more of the primary colors is modified based at least partially upon the current weighted light output value.

7. The method of claim 6, further comprising determining a set of preliminary light output value adjustments for one or more of the primary colors to achieve a target white chromaticity value based at least partially upon the current weighted light output value,
    wherein the light output value of one or more of the primary colors is modified based at least partially upon the set of preliminary light output value adjustments for one or more of the primary colors.

8. The method of claim 7, further comprising determining a predicted color- adjusted white light output value based at least partially on the current white light output value and the preliminary light output value adjustments for one or more of the primary colors, wherein the light output value of one or more of the primary colors is modified based at least partially upon the predicted color-adjusted white light output value.

9. The method of claim 1, wherein a luminance of the display device is less than 23.5 cd/m^2, an illuminance of the display device is less than 23.5 lux, or both.

10. A method for determining a color mix for a target white chromaticity value and a target white light output value on a three color display device with low luminance or illuminance, the method comprising:
measuring cyan, yellow, and green chromaticity values on the display device using a photometer;
measuring a current white chromaticity value and a current white light output value on the display device using the photometer;
generating a plot of a color gamut triangle based at least partially upon the measured cyan, yellow, green, and current white chromaticity values;
determining a blue chromaticity value on the color gamut triangle based at least partially upon the measured cyan, yellow, green, and current white chromaticity values;
determining a red chromaticity value on the color gamut triangle based at least partially upon the measured cyan, yellow, green, and current white chromaticity values;
selecting the target white chromaticity value and a target white light output value for the display device;
determining a target yellow chromaticity value based at least partially upon the blue chromaticity value and the target white chromaticity value;
determining a target cyan chromaticity value based at least partially upon the red chromaticity value and the target white chromaticity value;
determining a target weighted light output value of one or more primary colors based at least partially upon the red chromaticity value, the green chromaticity value, the blue chromaticity value, the target yellow chromaticity value, and the target cyan chromaticity value, wherein the one or more primary chromaticity values comprise the green chromaticity value, the blue chromaticity value, and the red chromaticity value;
determining a current yellow chromaticity value based at least partially upon the blue chromaticity value and the current white chromaticity value;
determining a current cyan chromaticity value based at least partially upon the red chromaticity value and the current white chromaticity value;
determining a current weighted light output value of the one or more primary colors based at least partially upon the red chromaticity value, the green chromaticity value, the blue chromaticity value, the current yellow chromaticity value, and the current cyan chromaticity value;
determining a set of preliminary light output value adjustments for the one or more primary colors to achieve the target white chromaticity value based at least partially upon the target weighted light output value of primary colors and the current weighted light output value of the primary colors;
determining a predicted color-adjusted white light output value based at least partially on the current white light output value and the preliminary light output value adjustments;
determining a light output value corrected set of adjustments for the primary colors to achieve the target white chromaticity value and the target white light output value; and
modifying the light output value of the primary colors on the display device based at least partially upon the light output value corrected set of adjustments.

11. The method of claim 10, wherein:
determining the blue chromaticity value comprises:
determining a first line on the plot based at least partially upon the measured yellow and current white chromaticity values;
determining a second line on the plot based at least partially upon the measured cyan and green chromaticity values; and
determining the blue chromaticity value on the color gamut triangle based at least partially upon an intersection of the first and second lines; and
determining the red chromaticity value comprises:
determining a third line on the plot based at least partially upon the measured cyan and current white chromaticity values;
determining a fourth line on the plot based at least partially upon the measured yellow and green chromaticity values; and
determining the red chromaticity value on the color gamut triangle based at least partially upon an intersection of the third and fourth lines.

12. The method of claim 11, wherein:
determining the target yellow chromaticity value comprises determining a fifth line on the plot based at least partially upon the blue chromaticity value and the target white chromaticity value, wherein the target yellow chromaticity value is at an intersection of the fifth line and the color gamut triangle; and
determining the target cyan chromaticity value comprises determining a sixth line on the plot based at least partially upon the red chromaticity value and the target white chromaticity value, wherein the target cyan chromaticity value is at an intersection of the sixth line and the color gamut triangle.

13. The method of claim 12, wherein:
determining the current yellow chromaticity value comprises determining a seventh line on the plot based at least partially upon the blue chromaticity value and the current white chromaticity value, wherein the current yellow chromaticity value is at an intersection of the seventh line and the color gamut triangle; and
determining the current cyan chromaticity value comprises determining an eighth line on the plot based at least partially upon the red chromaticity value and the current white chromaticity value, wherein the current cyan chromaticity value is at an intersection of the eighth line and the color gamut triangle.

14. The method of claim 10, wherein modifying the light output value of the primary colors comprises simultaneously modifying the light output value of primary colors and an overall device light output value control.

15. A system, comprising:
a photometer configured to measure a chromaticity value of a first primary color, a chromaticity value of a first secondary color, a chromaticity value of a second secondary color, a current white chromaticity value, and a current white light output value on a display device; and a computing system configured to perform operations, the operations comprising:
  generating a plot of a color gamut triangle based at least partially upon the measured chromaticity value of the first primary color, the measured chromaticity value of the first secondary color, the measured chromaticity value of the second secondary color, and the measured current white chromaticity value;
  determining a chromaticity value of a second primary color on the color gamut triangle based at least partially upon the measured chromaticity value of the first primary color, the measured chromaticity value of the first secondary color, the measured chromaticity value of the second secondary color, and the measured current white chromaticity value;
  determining a chromaticity value of a third primary color on the color gamut triangle based at least partially upon the measured chromaticity value of the first primary color, the measured chromaticity value of the first secondary color, the measured chromaticity value of the second secondary color, and the measured current white chromaticity value;
  determining a current chromaticity value of the first secondary color based at least partially upon the chromaticity value of the third primary color and the current white chromaticity value;
  determining a current chromaticity value of the second secondary color based at least partially upon the chromaticity value of the second primary color and the current white chromaticity value; and
  modifying the light output value of the primary colors based at least partially upon the chromaticity value of the second primary color, the chromaticity value of the third primary color, the current chromaticity value of the first secondary color, and the current chromaticity value of the second secondary color to produce a modified white chromaticity value and a modified white light output value on the display device.

16. The system of claim 15, wherein the operations further comprise:
  determining a target chromaticity value of the first secondary color based at least partially upon the chromaticity value of the third primary color and the target white chromaticity value; and
  determining a target chromaticity value of the second secondary color based at least partially upon the chromaticity value of the second primary color and the target white chromaticity value, wherein the light output value of one or more of the primary colors is modified based at least partially upon the target chromaticity value of the first secondary color and the target chromaticity value of the second secondary color.

17. The system of claim 16, wherein the operations further comprise determining a target weighted light output value of one or more of the primary colors based at least partially upon the target chromaticity value of the first secondary color and the target chromaticity value of the second secondary color, and wherein the light output value of one or more of the primary colors is modified based at least partially upon the target weighted light output value.

18. The system of claim 15, wherein the operations further comprise determining a current weighted light output value of the one or more primary colors based at least partially upon the current chromaticity value of the first secondary color and the current chromaticity value of the second secondary color, and wherein the light output value of one or more of the primary colors is modified based at least partially upon the current weighted light output value.

* * * * *